United States Patent
Moran et al.

(10) Patent No.: US 7,928,991 B2
(45) Date of Patent: Apr. 19, 2011

(54) COLOR SCHEME-COMPATIBLE COLOR SELECTION WITH HUE PRESERVATION

(75) Inventors: Evan Moran, Redmond, WA (US); Mark Thomas Nelson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

(21) Appl. No.: 11/344,330

(22) Filed: Jan. 31, 2006

(65) Prior Publication Data

US 2007/0176945 A1 Aug. 2, 2007

(51) Int. Cl.
*G09G 5/02* (2006.01)
(52) U.S. Cl. ........ 345/591; 345/589; 345/590; 345/592; 345/593; 345/594; 345/690
(58) Field of Classification Search ................. None
See application file for complete search history.

(56) References Cited

U.S. PATENT DOCUMENTS

| | | | |
|---|---|---|---|
| 5,473,736 A | 12/1995 | Young | |
| 5,615,320 A * | 3/1997 | Lavendel | 345/594 |
| 5,859,644 A | 1/1999 | Stokes et al. | |
| 5,903,255 A | 5/1999 | Busch et al. | |
| 5,909,220 A | 6/1999 | Sandow | |
| 5,995,655 A | 11/1999 | Lockett et al. | |
| 6,236,750 B1 | 5/2001 | Garber | |
| 6,373,738 B1 | 4/2002 | Towler et al. | |
| 6,456,293 B1 | 9/2002 | Grandy | |
| 6,456,296 B1 | 9/2002 | Cataudella et al. | |
| 6,870,544 B2 | 3/2005 | Blanchard et al. | |
| 2004/0085475 A1 * | 5/2004 | Skow et al. | 348/362 |
| 2005/0156943 A1 | 7/2005 | Fujioka et al. | |
| 2005/0185839 A1 | 8/2005 | Matsubara | |
| 2006/0112337 A1 * | 5/2006 | Jung et al. | 715/723 |
| 2006/0274180 A1 * | 12/2006 | Yasuda | 348/333.01 |
| 2008/0297451 A1 * | 12/2008 | Marcu | 345/77 |

FOREIGN PATENT DOCUMENTS

WO WO2005019958 3/2005

OTHER PUBLICATIONS

Title: Creating a Color Scheme, Author: Chainstyle, Date: Oct. 13, 2005, pp. 14.*
Title: Automatic color scheme picker for document templates based on image analysis and dual problem, Author: Obrador, Pere, Date: Jan. 16-17, 2006, pp. 12.*
"Color Wheel Pro-See Color Theory in Action," http://www.color-wheel-pro.com/index.html, 2 pages [last accessed Oct. 6, 2008].
"ColorMania-Advanced Color Piker Utility," http://www.blacksunsoftware.com/colormania.html, Copyright 1999-2005, 2 pages [last accessed Oct. 6, 2008].
"D2 Software Nuke 4.1," http://shop.store.yahoo.com/toolfarm/d2softwarenuke.html, Copyright 1999-2005, 4 pages [last accessed Oct. 6, 2008].

(Continued)

*Primary Examiner* — Xiao M Wu
*Assistant Examiner* — Jwalant Amin
(74) *Attorney, Agent, or Firm* — Perkins Coie LLP

(57) ABSTRACT

A facility for adapting a subject color to be compatible with a basis color is described. The facility accesses a color transformation specification that specifies how the subject color is to be adapted to be compatible with the basis color. The facility then applies the accessed color transformation specification to the subject color to adapt the subject color to be compatible with the basis color.

22 Claims, 9 Drawing Sheets
(5 of 9 Drawing Sheet(s) Filed in Color)

OTHER PUBLICATIONS

Braun, Gustav, et al., "Color Gamut Mapping in a Hue-Linearized CIELAB Color Space," Proceedings of the 6th IS&T/SID Color Imaging Conference, 1998, http://www.cis.rit.edu/fairchild/PDFs/PRO04.pdf, 6 pages [last accessed Oct. 6, 2008].

Crawford, Mmalcolm, "Color Selection in NEXTSTEP and OPENSTEP," May 25, 1998, Copyright 1998, http://vvww.stepwise.com/Articles/Technical/ColorWheel.html, 5 pages [last accessed Oct. 8, 2008].

* cited by examiner

COLOR SCHEME-COMPATIBLE COLOR SELECTION WITH HUE PRESERVATION

TECHNICAL FIELD

The described technology is directed to the field of computer applications, and, more particularly, to the field of applying colors to documents generated to computer applications.

BACKGROUND

In a variety of software applications for creating documents, such as applications for creating text documents, drawing documents, chart documents, slideshow documents, or spreadsheet documents, a user can both create document elements (such as organization chart shapes in a drawing document) and assign colors to elements. While users can use this capability to create documents that are more visually interesting than documents that are uniformly black and white, it is typical for users who are not professional graphic designers to select colors that are discordant, or otherwise visually incompatible, when displayed together. Creating documents exhibiting such color incompatibility is generally undesirable to the creators and users of such documents.

In order to assist less experienced users in choosing coordinated colors, some applications provide predefined color schemes. Each color scheme specifies a color (each color being a particular combination of hue, luminance, and saturation values) for each of a number of document element features. For example, in a drawing application, every color scheme may specify a color used for lines making up the borders of drawing shapes, a color used to fill shapes, a color used for text included in shapes, and a color used for shadows cast by shapes. The different colors in a color scheme are selected by the designers of the application to be visually compatible, so as to be pleasing when displayed together.

Each shape created using a color scheme uses the color scheme's colors for all of its features. For example, where an organizational chart having three shapes each representing a different division of a company is created using a scheme, each of the three shapes has the same border color, fill color, and so on. When a user creates a document whose elements' colors are all selected by applying a color scheme, the coordination of the colors of the scheme generally lends the document a certain visual appeal.

In the case of some applications, where document elements are created using one color scheme, their colors can be transformed by applying different color schemes until the user is satisfied with the appearance of the document. For example, where shapes are created using a color scheme whose fill color is blue, a different color scheme may be applied to the shape that specifies purple as its fill color, resulting in the fill color of all of the shapes being changed to purple.

In order to communicate more information, however, a user may wish to color a drawing element differently from other similar drawing elements. For example, in the organizational chart mentioned above—where the scheme's fill color is blue, causing the division shapes to generally be filled with blue—the user may wish to color the shape for an underperforming division red to visually reflect its underperformance. In order to do so, the user must select a color not specified in the color scheme, which may be visually incompatible with the colors of the scheme, and therefore incompatible with the colors of the other drawing elements.

Also, if the user chooses to apply a different scheme to the scheme-colored elements, it is generally not possible to apply the new scheme to the user-colored element without discarding the user-selected color and homogenizing the coloring of this element with that of the others.

SUMMARY

A software facility for providing color scheme-compatible color selection with hue preservation ("the facility") is described. In some embodiments, where a user is creating a document in which a color scheme is used to automatically assign a color to a particular feature of one or more document elements, such as to assign the same fill color to each of number of division shapes in a drawing document, the facility assists the user in choosing alternative colors for the same feature of certain shapes that are compatible with the colors of the scheme by displaying a palette of colors tailored to be compatible with those of the scheme. When the user selects a color from the palette, the facility applies it to the element to be colored, resulting in a document that uses heterogeneous, but compatible colors. If the user subsequently switches to a different scheme for the document, the facility both (1) adapts the colors of the palette to be compatible with the new color scheme, and (2) similarly adapts the colors of elements colored with colors of the palette.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawings will be provided by the U.S. Patent Office upon request and payment of the necessary fee.

DETAILED DESCRIPTION

Figure 1:
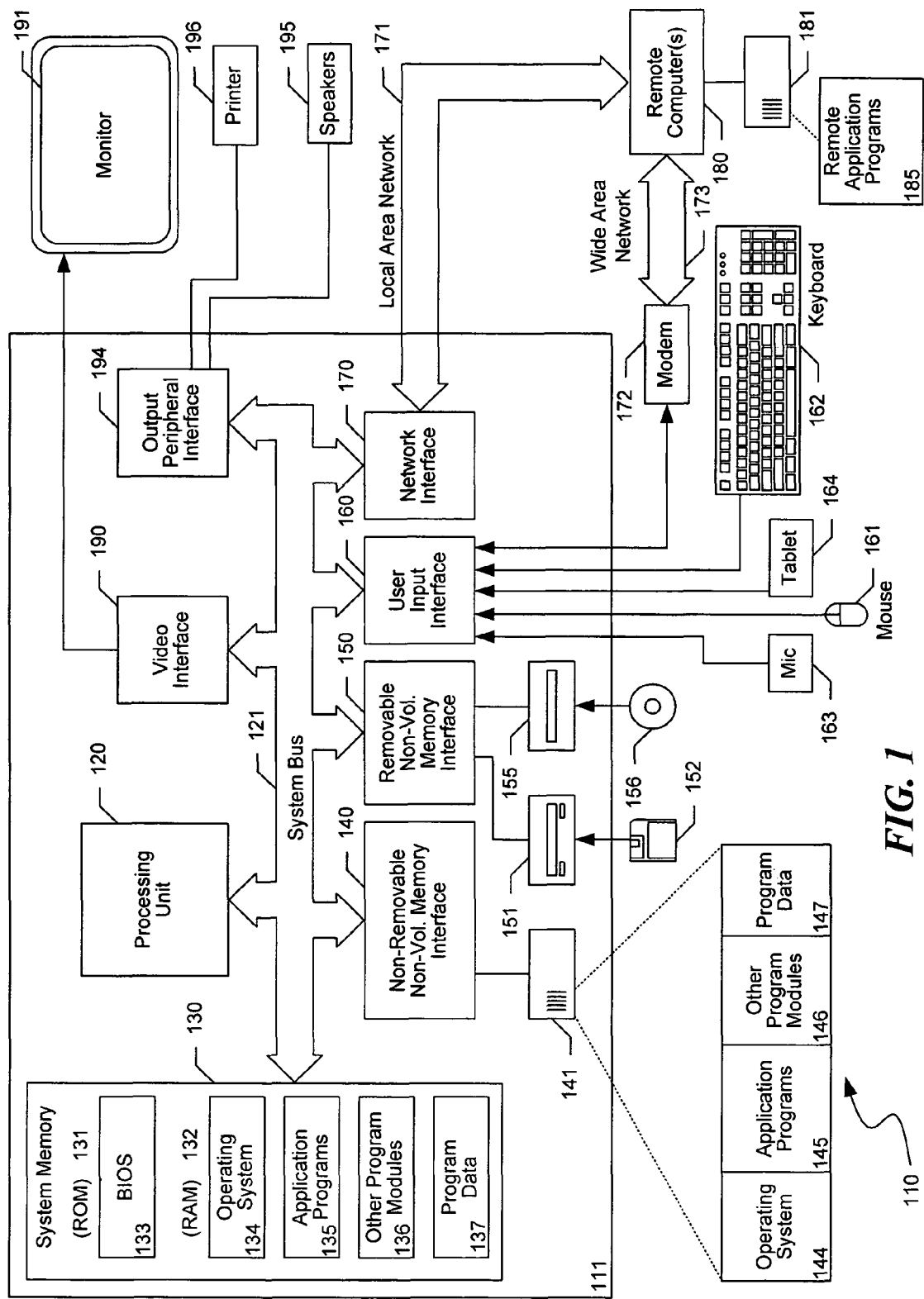
FIG. 1 is a block diagram illustrating an example of a suitable computing system environment 110 or operating environment in which the techniques or facility may be implemented.

A software facility for providing color scheme-compatible color selection with hue preservation ("the facility") is described. In some embodiments, where a user is creating a document in which a color scheme is used to automatically assign a color to a particular feature of one or more document elements, such as to assign the same fill color to each of number of division shapes in a drawing document, the facility assists the user in choosing alternative colors for the same feature of certain shapes that are compatible with the colors of the scheme by displaying a palette of colors tailored to be compatible with those of the scheme. When the user selects a color from the palette, the facility applies it to the element to be colored, resulting in a document that uses heterogeneous, but compatible colors. If the user subsequently switches to a different scheme for the document, the facility both (1) adapts the colors of the palette to be compatible with the new color scheme, and (2) similarly adapts the colors of elements colored with colors of the palette.

In some embodiments, the facility enables the user to choose any available hue value for an element, and generates a scheme-compatible for the element that is based on that hue. In some embodiments, the facility permits the user to specify any fully-qualified color. In response, the facility assigns the user-specified color to a selected element, and (1) adapts the colors of the current scheme to be compatible with the user-specified color, and/or (2) adapts other colors used in the document to be compatible with the user-specified color.

In some embodiments, the facility adapts a subject color to be compatible with a scheme by adapting it to be compatible with a color specified by the scheme for a primary feature of document elements, such as the fill feature for drawing shapes. In some embodiments, the facility adapts a subject color to be compatible with a basis color by (1) assigning to the subject color a luminance value and a saturation value that are respectively derived from the luminance value and saturation value of the basis color, and (2) leaving the subject color's hue value unchanged. In some embodiments, the facility derives the luminance value for the subject color by copying the luminance value of the basis color. In some embodiments, the facility derives the luminance value for the subject color by skewing the luminance value of the basis color toward the center of the range of available luminance values. In some embodiments, the facility derives the saturation value for the subject color by translating the saturation value of the basis color into the high end of the range of available saturation values. In some embodiments, the facility derives the saturation value for the subject color by copying the saturation value of the basis color.

By performing in some or all of the ways described above, the facility assists the user to create an appealing, professional-looking document that uses a set of visually-compatible colors.

FIG. 1 is a block diagram illustrating an example of a suitable computing system environment 110 or operating environment in which the techniques or facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary operating environment 110.

The facility is operational with numerous other general purpose or special purpose computing system environments or configurations. Examples of well-known computing systems, environments, and/or configurations that may be suitable for use with the facility include, but are not limited to, personal computers, server computers, handheld or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the facility includes a general purpose computing device in the form of a computer 111. Components of the computer 111 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 111 typically includes a variety of computer-readable media. Computer-readable media can be any available media that can be accessed by the computer 111 and include both volatile and nonvolatile media and removable and nonremovable media. By way of example, and not limitation, computer-readable media may comprise computer storage media and communications media. Computer storage media include volatile and nonvolatile and removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 111. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as a wired network or direct-wired connection, and wireless media, such as acoustic, RF, infrared, and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within the computer 111, such as during start-up, is typically stored in ROM 131. RAM 132 typically contains data and/or program modules that are immediately accessible to and/or presently being operated on by the processing unit 120. By way of example, and not limitation, FIG. 1 illustrates an operating system 134, application programs 135, other program modules 136, and program data 137.

The computer 111 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a nonremovable memory interface, such as an interface 140, and the magnetic disk drive 151 and optical disk drive 155 are typically connected to the system bus 121 by a removable memory interface, such as an interface 150.

The drives and their associated computer storage media, discussed above and illustrated in FIG. 1, provide storage of computer-readable instructions, data structures, program modules, and other data for the computer 111. In FIG. 1, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers herein to illustrate that, at a minimum, they are different copies. A user may enter commands and information into the computer 111 through input devices such as a tablet or electronic digitizer 164, a microphone 163, a keyboard 162, and a pointing device 161, commonly referred to as a mouse, trackball, or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch-screen panel can be physically coupled to a housing in which the computer 111 is incorporated, such as in a tablet-type personal computer. In addition, computing devices such as the computer 111 may also include other peripheral output devices such as speakers 195 and a printer 196, which may be connected through an output peripheral interface 194 or the like.

The computer 111 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 111, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets, and the Internet. For example, in the present facility, the computer 111 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 111 is connected to the LAN 171 through a network interface or adapter 170: When used in a WAN networking environment, the computer 111 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 111, or portions thereof, may be stored in the remote memory storage device 181. By way of example, and not limitation, FIG. 1 illustrates remote application programs 185 as residing on the memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

In order to more fully describe the facility, its operation in connection with a specific example is discussed below in connection with FIGS. 2-6.

Figure 2:
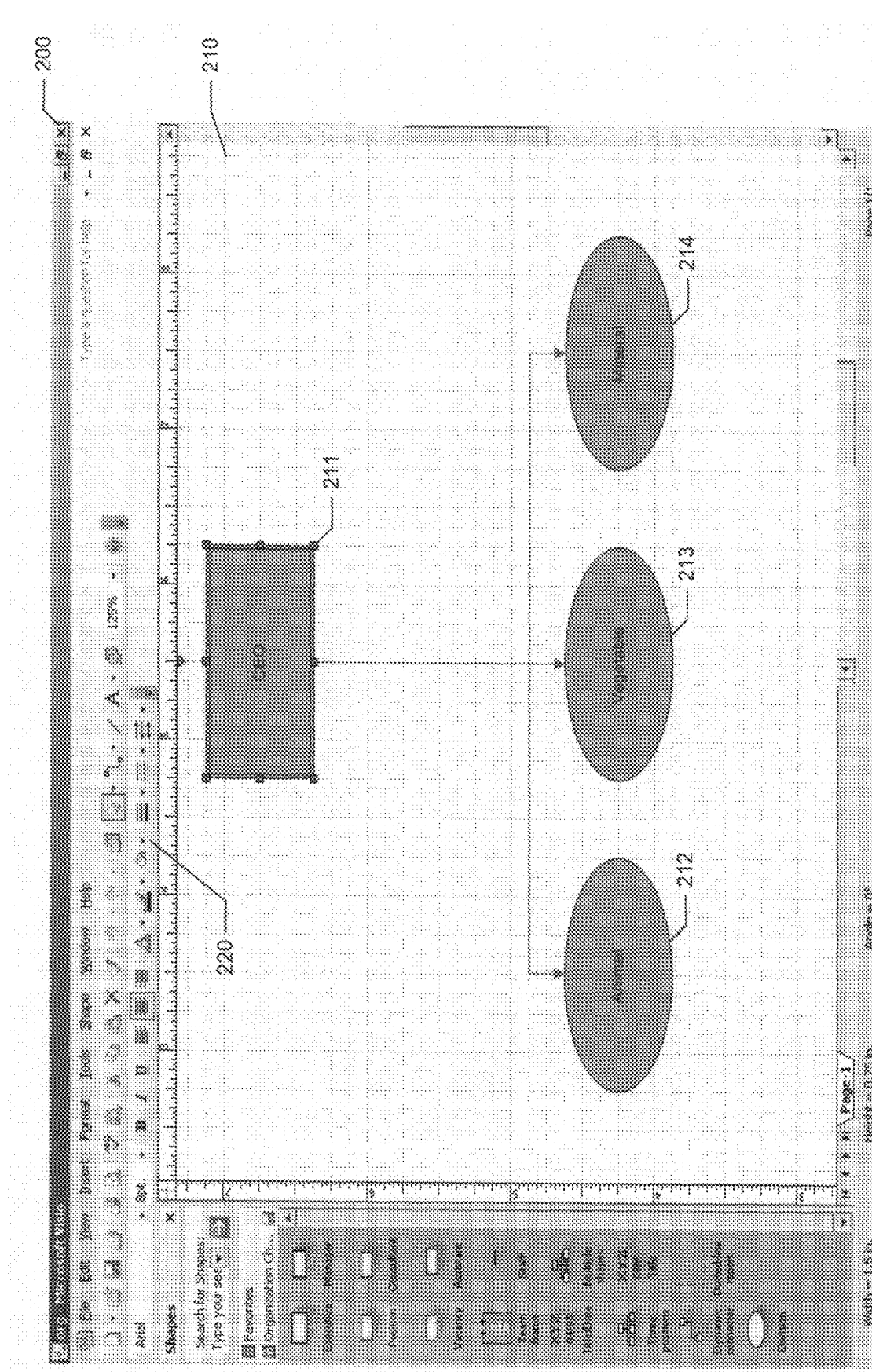
FIG. 2 is a user interface diagram showing the creation of an organizational chart document.

FIG. 2 is a user interface diagram showing the creation of an organizational chart document. The drawing application displays application window 200, which contains a client area 210 in which the document is created. The document contains document elements (here, drawing shapes) 211-214. These elements all initially have a blue fill color in accordance with a first color scheme that is in effect when the elements are added to the document. In order to change the fill color of the Vegetable element 213, the user first clicks on it to select it, then clicks on fill drop-down list box control 220.

Figure 3:
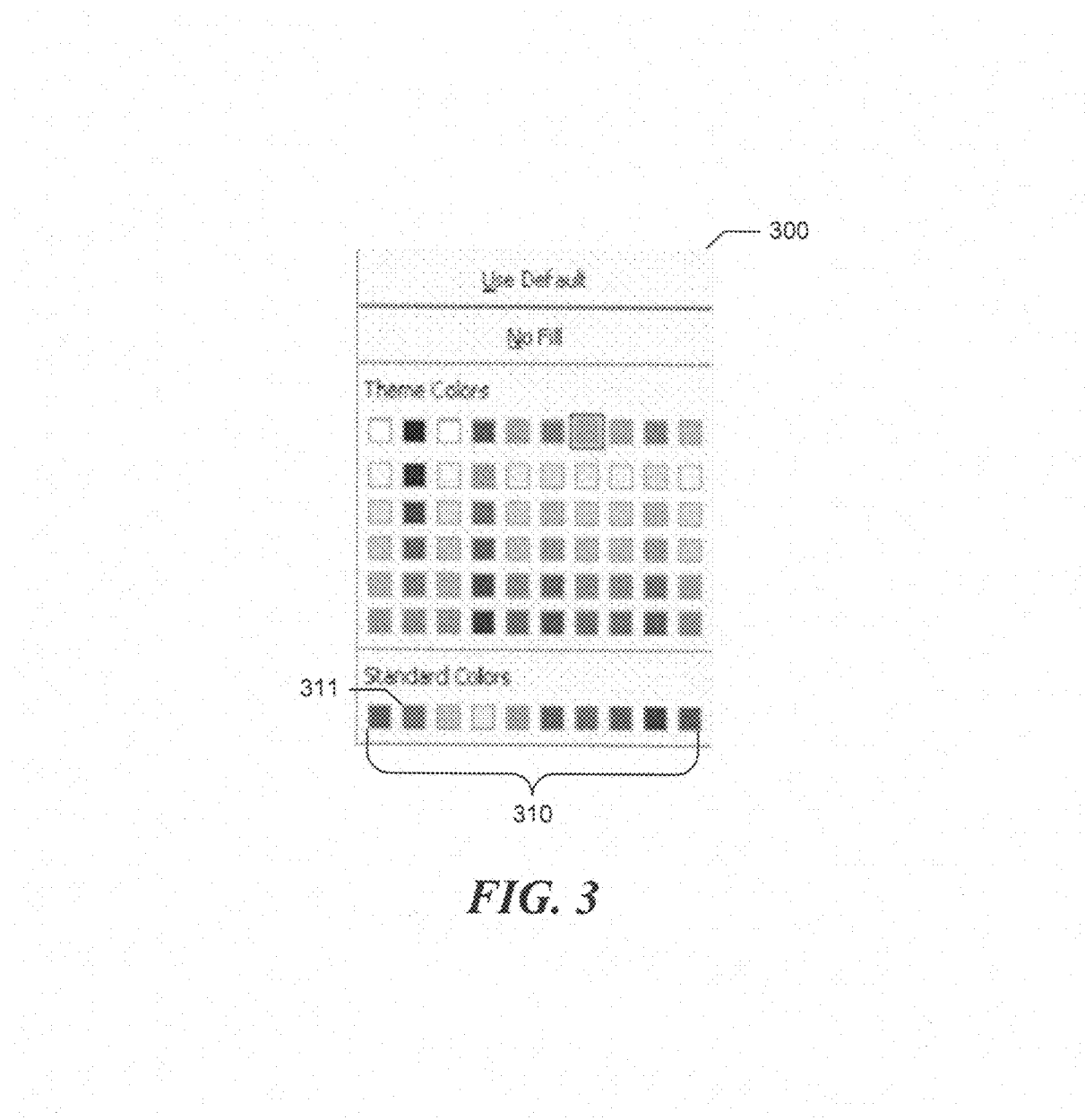
FIG. 3 is a user interface diagram showing a drop-down list that is displayed when the user clicks on the fill drop-down list box control.

FIG. 3 is a user interface diagram showing a drop-down list that is displayed when the user clicks on the fill drop-down list box control. The drop-down list box control 300 includes various colors that the user may select for the fill color of the selected document element. In particular, the drop-down list box includes a palette 310 of "Standard Colors"—a name used to identify colors that are coordinated with the current scheme. In order to change the fill color of document element 213 to a red color that is compatible with the current color scheme, the user selects color chip 311 from the standard colors palette.

Figure 4:
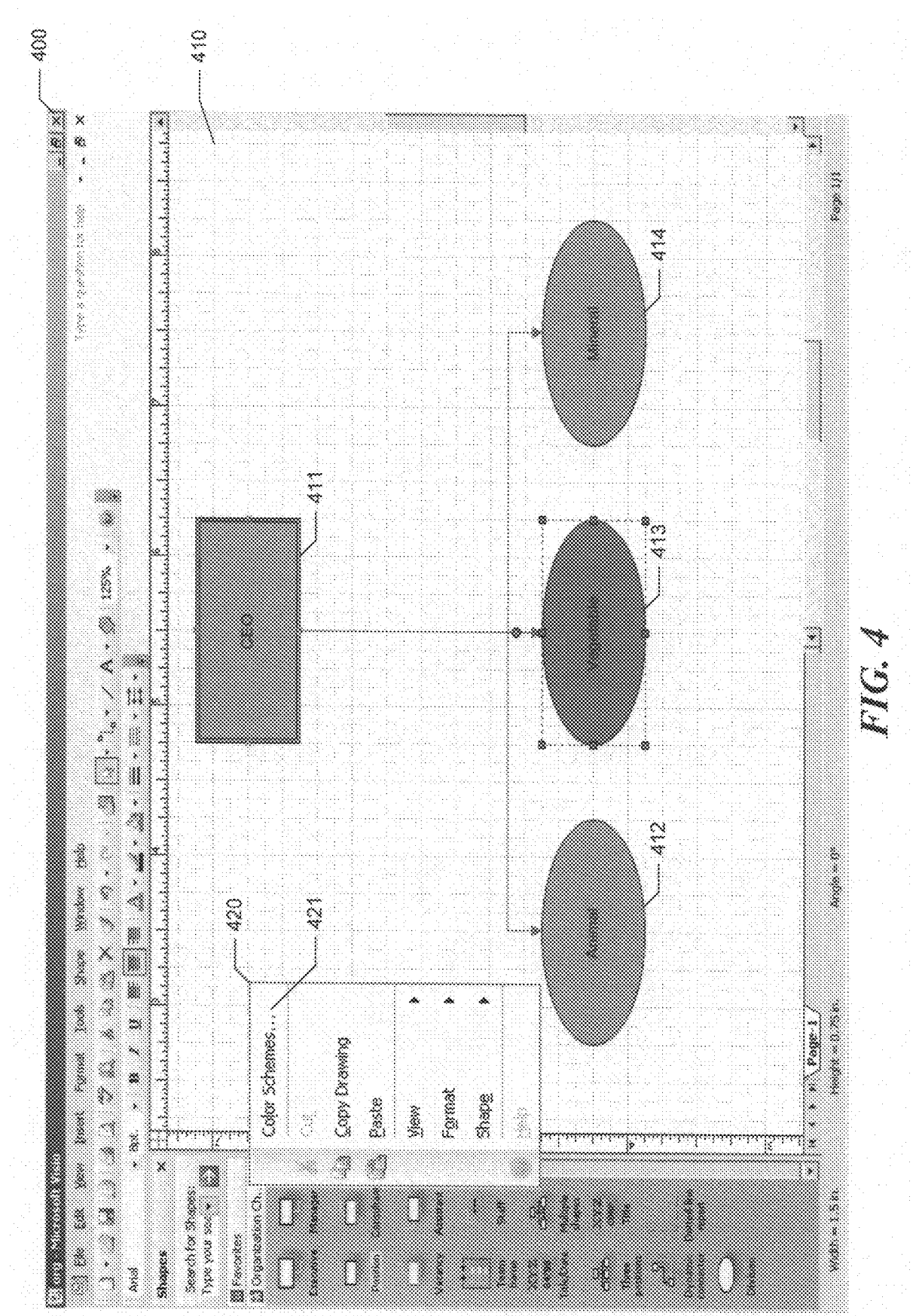
FIG. 4 is a user interface diagram showing the result of selecting the red color chip from the Standard Colors palette.

FIG. 4 is a user interface diagram showing the result of selecting the red color chip from the Standard Colors palette. It can be seen that the fill color of the Vegetable document element 413 has been changed to the red color selected from Standard Colors palette, and is visually compatible with the fill color specified by the current color scheme, used in the other three shapes, 411, 412, and 414.

When the user subsequently wishes to change this first color scheme to a different color scheme, the user right-clicks in the client area 410 to display a context menu 420, selects a Color Schemes entry 421 from the context menu, and selects a different color scheme in the dialog box that subsequently opens. Alternatively, the user clicks a Theme toolbar button, and selects a different color scheme in the dialog box that subsequently opens.

Figure 5:
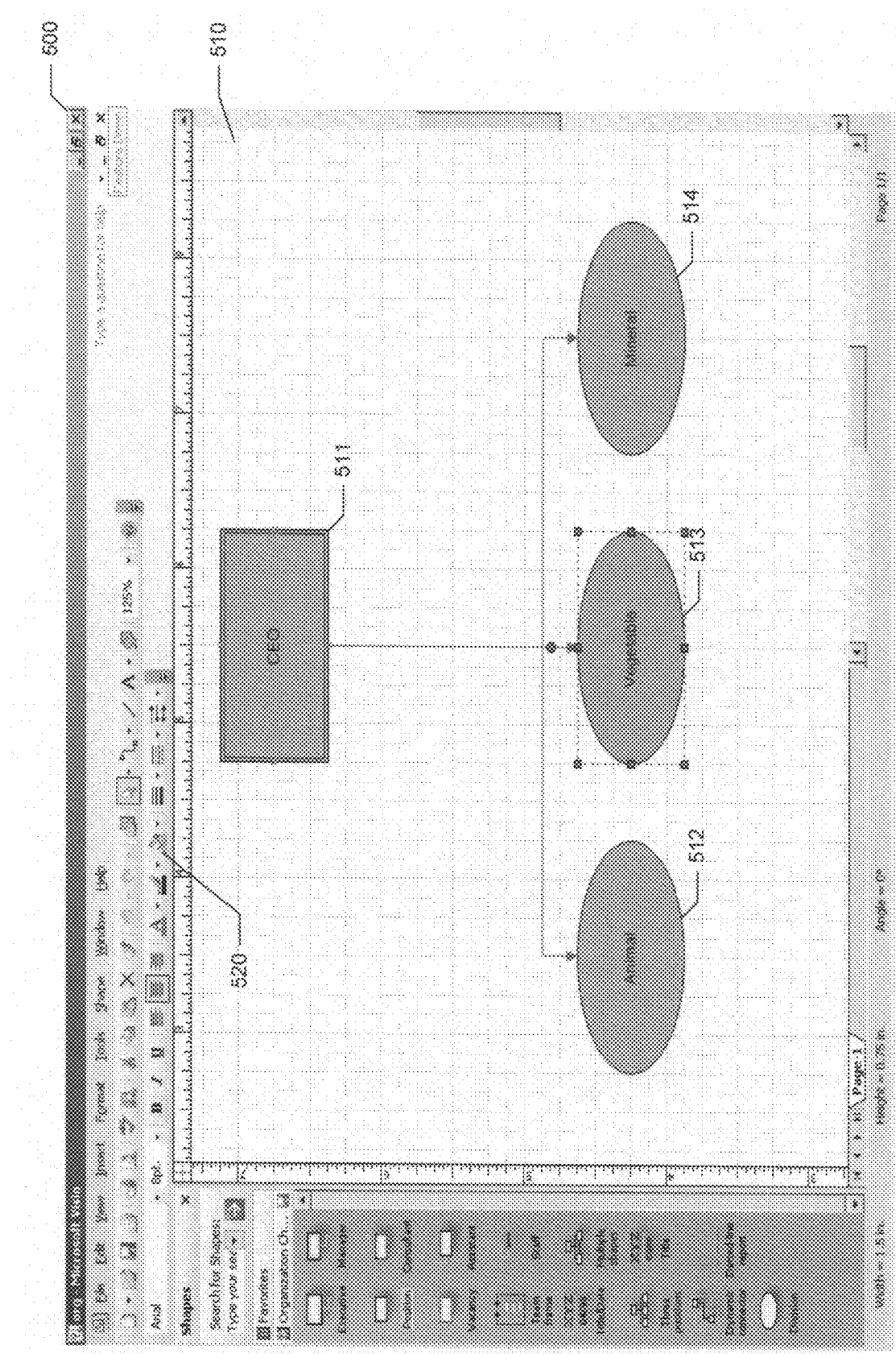
FIG. 5 is a user interface diagram showing the results of selecting a new current color scheme.

FIG. 5 is a user interface diagram showing the results of selecting a new current color scheme. It can be seen that elements 511, 512, and 514, which were created in accordance with the original scheme and whose fill color was not subsequently manually changed by the user, have a new, lighter shade of blue as their fill color in accordance with the newly-selected color scheme. Element 513, whose fill color was manually changed by the user to a red fill color, continues to have a red fill color, but one that has been adapted to be visually compatible with the lighter blue fill color specified by the new color scheme. In particular, the original red fill color has been adapted by holding its hue value constant, but adjusting its saturation and luminance values to be similar to or the same as the saturation and luminance values of the fill color specified by the new color scheme. Accordingly, after manually assigning a color to a document element, the user can change color schemes and have the manually-assigned color adapted to be coordinated with the new color scheme.

Figure 6:
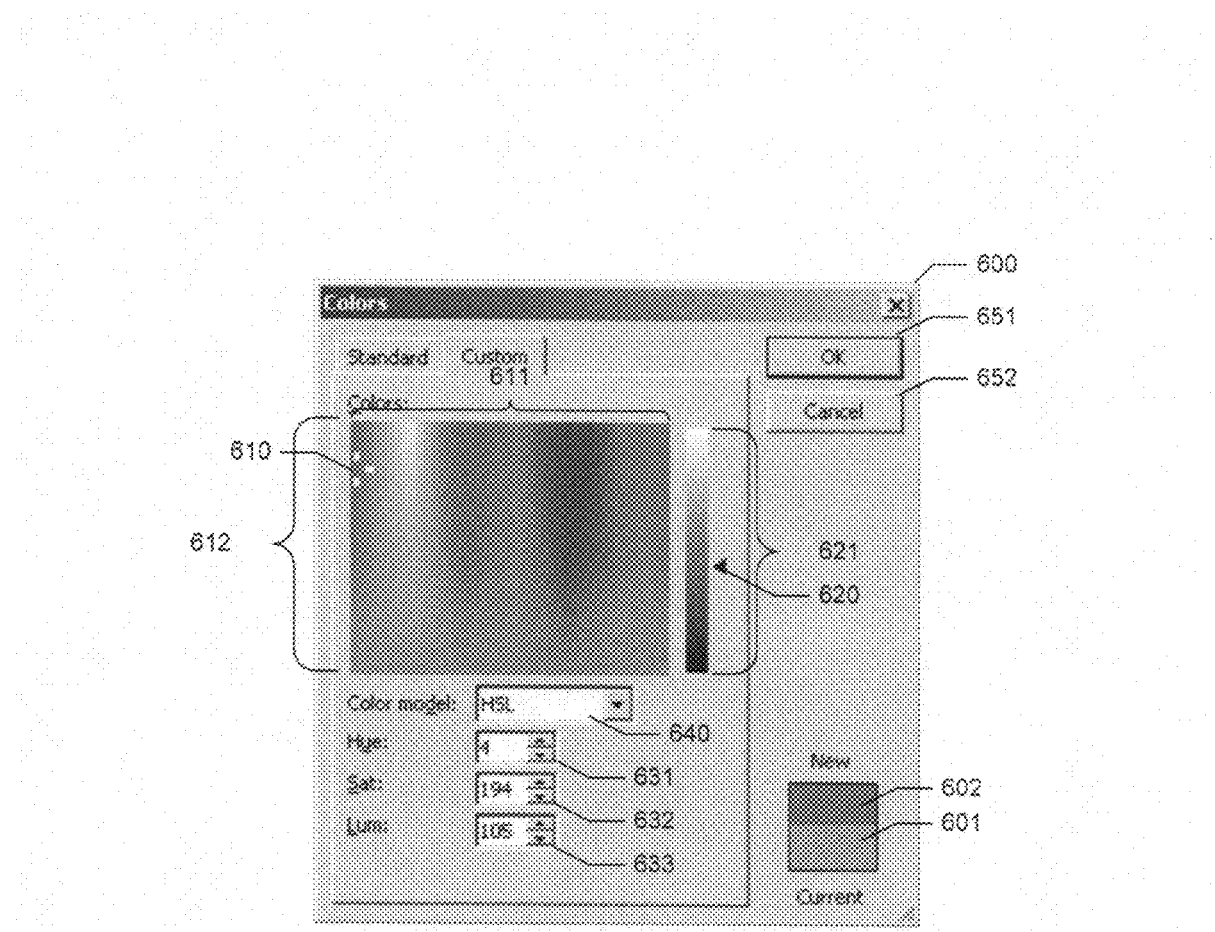
FIG. 6 is a user interface diagram showing the Custom Color dialog.

In some embodiments, the fill drop-down list box further contains a link to a Custom Color dialog that a user can use to specify a Custom Color. FIG. 6 is a user interface diagram showing the Custom Color dialog. The dialog 600 includes spatial controls 610 and 620 for specifying a color. The user can drag control 610 to any point in a range of hue values 611, as well as a range of saturation values 612. The user can drag control 620 to any point in a range of luminance values 621. Alternatively, the user can specify color by numerically specifying hue, saturation, and luminance values using controls 621-633. Alternatively, the user can select a different color model for specifying the color, such as an RGB model in which a color is specified using red, green, and blue values, using control 640. Regions 601 and 602 display the current color of the drawing element and the new color of the element specified using the dialog, respectively. To accept the new color, the user clicks an OK button 651. To close the dialog without applying the new color, the user clicks a cancel button 652.

In some embodiments, when the user applies a Custom Color to a drawing element, the facility either (1) adapts the custom color to the current color scheme as part of its application, or (2) while it is not initially adapted, adapts the custom color to each new color scheme that is subsequently selected by the user.

Figure 7:
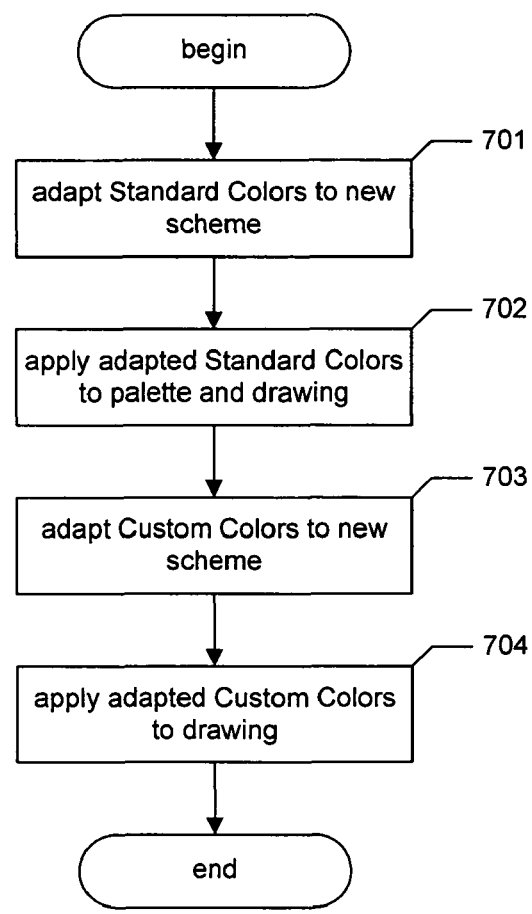
FIG. 7 is a flow diagram showing steps typically performed by the facility when the user selects a new color scheme.

FIG. 7 is a flow diagram showing steps typically performed by the facility when the user selects a new color scheme. In step 701, the facility adapts each of the Standard Colors displayed in the scheme-compatible palette to the new scheme. Step 701 is discussed in greater detail below. In step 702, the facility applies the adapted standard colors to the scheme-adapted palette, as well as to any drawing elements to which standard colors were earlier applied. In step 703, the facility adapts any Custom Colors used in the document to the new color scheme. Step 703 is discussed in greater detail below. In step 704, the facility applies the Custom Colors adapted in step 703 to the drawing elements having the Custom Colors. After step 704, these steps conclude.

Those skilled in the art will appreciate that the steps shown in FIG. 7 and in each of the flow diagrams discussed below may be altered in a variety of ways. For example, the order of the steps may be rearranged; substeps may be performed in parallel; shown steps may be omitted, or other steps may be included; etc.

In various embodiments, the facility uses various approaches to adapting a subject color to a basis color scheme. In some embodiments, the facility adapts a subject color to a basis color scheme by adapting the subject color to a basis color that is the predominant color in the basis color scheme, such as the fill or foreground color specified by the basis color scheme. In some embodiments, the facility adapts a subject color to a basis color by maintaining the hue value of the subject color unchanged, and replacing the saturation and luminance values of the subject color with the saturation and luminance values of the basis color. In some embodiments, to account for the wide range of possible saturation and luminance values among basis colors, the facility adjusts the luminance and/or saturation values of the basis color before attributing them to the subject color. As a first example, the facility may adjust the basis color's luminance value by calculating a weighted average of the basis color's luminance value with the central luminance value (the value 120 on a scale of 0 to 240) where the basis color's luminance value is weighted twice as heavily as the center luminance. As a second example, the facility may adjust the basis color's luminance value by calculating a weighted average of the basis color's luminance value with the central luminance value (the value 120 on a scale of 0 to 240) where the basis color's luminance value is weighted half as heavily as the center luminance. In some embodiments, the facility adjusts the basis color's saturation value by choosing the larger of the central saturation value (120 on a scale of 0 to 240) and the basis color's luminance value. In some embodiments, this maximum value is further incremented by a configurable increment value. In general, it is sometimes regarded as desirable to use a luminance value that is near the central luminance value, and a saturation value that is within the top half of the saturation scale.

Figure 8:
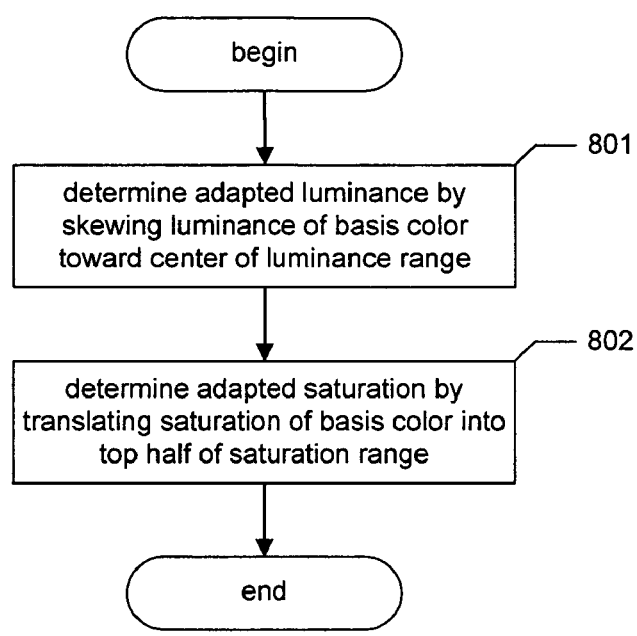
FIG. 8 is a flow diagram showing steps typically performed by the facility in some embodiments to adapt a subject color to a basis color.

FIG. 8 is a flow diagram showing steps typically performed by the facility in some embodiments to adapt a subject color to a basis color. In step 801, the facility determines an adapted luminance value by skewing luminance value of the basis value toward the center of the luminance range. In step 802, the facility determines an adapted saturation value for the subject color by translating the saturation value of the basis color into the top half of the saturation range. After step 802, these steps conclude.

Figure 9:
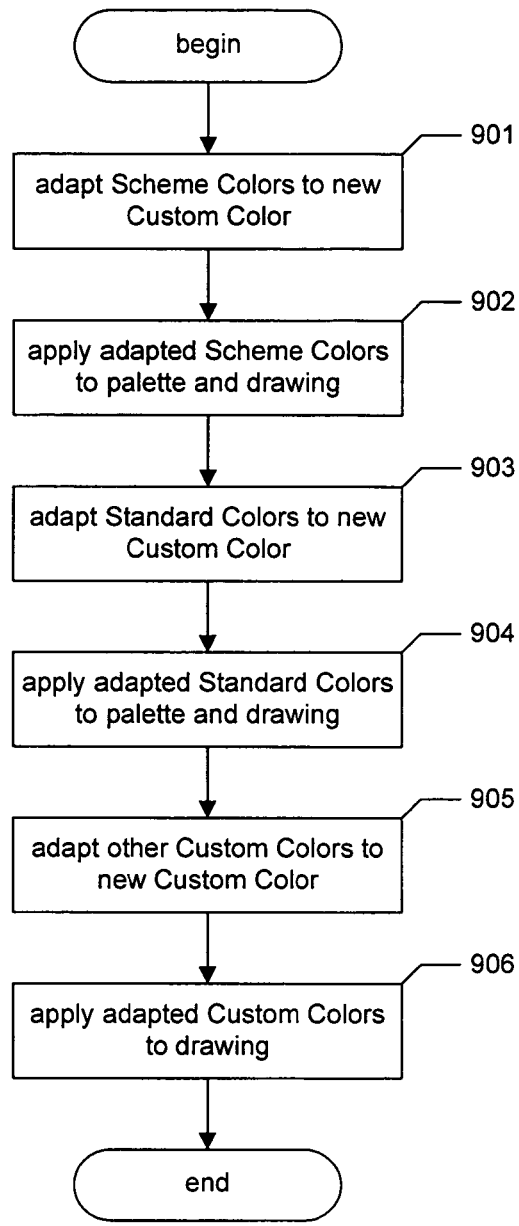
FIG. 9 is a flow diagram showing steps typically performed by the facility to adapt other colors used in a document to a user-specified Custom Color.

In some embodiments, when the user applies a Custom Color to an element of the current document, the facility adapts some or all of the other colors used in the document to be compatible with the Custom Color. FIG. 9 is a flow diagram showing steps typically performed by the facility to adapt other colors used in a document to a user-specified Custom Color. In step 901, the facility adapts the colors of the current color scheme to the new Custom Color. In step 902, the facility applies the adapted scheme colors to the palette and the document. In step 903, the facility adapts the standard colors to the new Custom Color, either by adapting them to the new Custom Color direction, or by adapting them to the scheme as adapted in step 901. In step 904, the facility applies the adopted standard colors to the palette and the document. In step 905, the facility adapts earlier-selected Custom Colors to the new Custom Color. In step 906, the facility applies the adapted Custom Colors to the document. After step 906, these steps conclude.

It will be appreciated by those skilled in the art that the above-described facility may be straightforwardly adapted or extended in various ways. For example, in various embodiments, the facility employs a wide variety of approaches to adapting subject colors to basis color schemes and/or basis colors. While the foregoing description makes reference to particular embodiments, the scope of the invention is defined solely by the claims that follow and the elements recited therein.

We claim:

1. A method performed by a computing system to provide a user interface usable to create a document containing colored document elements, comprising:
   identifying a current color scheme being used to create the document;
   displaying a palette containing a plurality of color regions; and
   in each color region of the palette, displaying a color obtained by automatically adapting a starting color specified for the color region to be visually compatible with the identified color scheme,
wherein a luminance value of the adapted color was obtained using a luminance value of the starting color and a luminance value in a center of an available range of luminance values, wherein the luminance value of the adapted color is between the luminance value of the starting color and the luminance value in the center of the available range of luminance values, and
wherein code implementing the method is stored in memory of the computing system for execution by a processor of the computing system.

2. The method of claim 1, further comprising:
   at a time when a distinguished element of the document is selected, receiving user input selecting one of the color regions of the palette; and
   in response to the user input selecting one of the color regions of the palette, altering the distinguished element to incorporate the color displayed in the selected color region in the display of the distinguished element.

3. The method of claim 2, further comprising:
   after the altering, receiving user input selecting a new current color scheme; and
   in response to the user input selecting a new current color scheme:
      identifying a dominant color specified by the new color scheme,
      adapting the color displayed in the selected color region to be visually compatible with the dominant color specified by the new color scheme to obtain a revised color, and
      altering the distinguished element to incorporate the revised color in the display of the distinguished element.

4. The method of claim 1 wherein each adapted color comprises a saturation value copied from the identified color.

5. The method of claim 1 wherein a hue value of each adapted color is unchanged from its starting color.

6. The method of claim 1 wherein the luminance value of the adapted color was obtained using a weighted average of the luminance value of the starting color and the luminance value in the center of the available range of luminance values.

7. A non-transitory computer-readable storage medium whose contents cause a computing system to perform a method for adapting a subject color to be compatible with a basis color, the subject color having a luminance value, the method comprising:
   accessing a color transformation specification that specifies how the subject color is to be adapted to be compatible with the basis color, the color transformation specification specifying that the subject color be adapted to be compatible with the basis color by establishing a luminance value for the adapted subject color using the luminance value of the subject color and a luminance value in a center of an available ramie of luminance values; and
   applying the accessed color transformation specification to the subject color to automatically adapt the subject color to be compatible with the basis color,
wherein the luminance value of the adapted subject color is between the luminance value of the subject color and the luminance value in the center of the available range of luminance values.

8. The non-transitory computer-readable storage medium of claim 7, further comprising displaying, in the context of a document, a document element that incorporates the adapted color in at least one visual feature of the document element.

9. The non-transitory computer-readable storage medium of claim 7, further comprising, before applying the accessed color transformation specification to the subject color, determining that the subject color is presently applied to the document element.

10. The non-transitory computer-readable storage medium of claim 7 wherein the basis color is stored in connection with a document by an application program that uses a shape sheet to represent and manipulate the state of document elements, the shape sheet comprising one or more cells, and wherein the accessed color transformation specification is called from a cell of a shape sheet.

11. The non-transitory computer-readable storage medium of claim 7, further comprising, before applying the accessed color transformation specification to the subject color, accessing an indication specifying at least a hue value for the subject color and indicating that the adapted subject color has been selected to appear in a scheme-compatible color palette.

12. The non-transitory computer-readable storage medium of claim 7, further comprising, before applying the accessed color transformation specification to the subject color, receiving user input specifying at least a hue value of the subject color.

13. The non-transitory computer-readable storage medium of claim 7, further comprising:
   receiving user input changing a current color scheme from a first color scheme to a second color scheme, the first color scheme specifying a first color for a distinguished document element feature, the second color scheme specifying a second color for the distinguished document element feature; and
   selecting the second color as the basis color.

14. The non-transitory computer-readable storage medium of claim 13 wherein the distinguished document element feature is a fill document element feature.

15. The non-transitory computer-readable storage medium of claim 13 wherein the distinguished document element feature is a document element feature likely to dominate the appearance of documents prepared with the second color scheme.

16. The non-transitory computer-readable storage medium of claim 7, further comprising:
   receiving user input specifying a color for an element feature of an element of a document; and
   selecting the specified color as the basis color.

17. The non-transitory computer-readable storage medium of claim 7 wherein the basis color has a saturation value,
   and wherein the color transformation specification further specifies that the subject color be adapted to be compatible with the basis color by establishing a saturation value for the adapted subject color that is equal to the saturation value of the basis color.

18. The non-transitory computer-readable storage medium of claim 7 wherein the basis color has a saturation value within a range of possible saturation values,
   and wherein the color transformation specification further specifies that the subject color be adapted to be compatible with the basis color by translating the saturation value of the basis color into the top half of the range of possible saturation values to obtain a saturation value for the adapted subject color.

19. One or more computer memories collectively storing a document data structure, comprising:
   information identifying a distinguished document element; and
   information specifying a color in which the distinguished document element is to be displayed, the specified color having been obtained by automatically adapting a starting color to be compatible with a basis color,
such that contents of the data structure may be used to display the distinguished document element
wherein a luminance value of the specified color was obtained using a luminance value of the starting color and a luminance value in a center of an available range of luminance values, and
wherein the luminance value of the specified color is between the luminance value of the starting color and the luminance value in the center of the available range of luminance values.

20. The computer memories of claim 19 wherein a saturation value of the specified color was obtained by copying a saturation value of the basis color.

21. The computer memories of claim 19 wherein a saturation value of the specified color was obtained by translating a saturation value of the basis color toward the high end of an available range of saturation values.

22. One or more computer memories collectively storing a document data structure, comprising:
   information identifying a distinguished document element; and
   information specifying a color in which the distinguished document element is to be displayed, the specified color having been obtained by automatically adapting a starting color to be compatible with a basis color, the specified color having the same hue value as the starting color, such that contents of the data structure may be used to display the distinguished document element,
wherein a luminance value of the specified color was obtained by determining a weighted average of a luminance value of the basis color and a luminance value in the center of an available range of luminance values.

* * * * *